Oct. 5, 1954   R. H. FAY   2,690,704
MACHINE TOOL
Filed Sept. 12, 1952   2 Sheets-Sheet 2
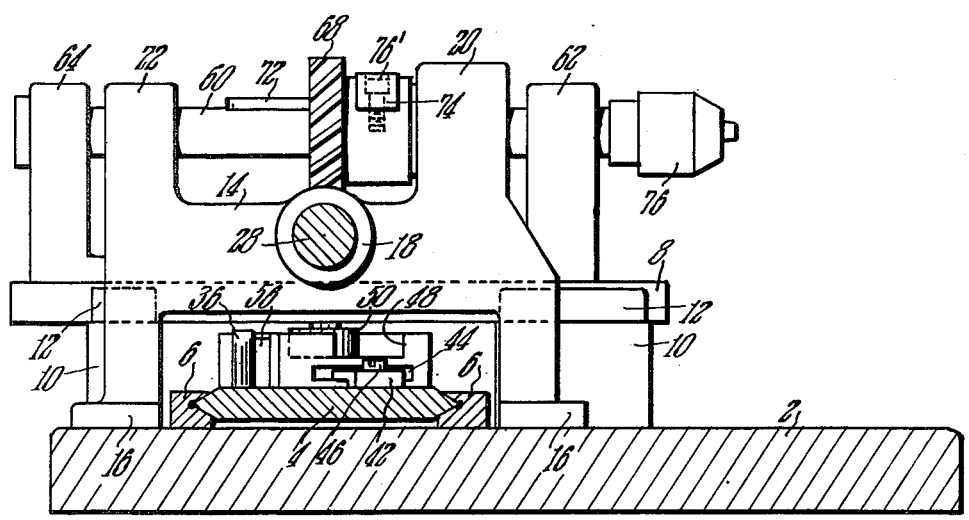
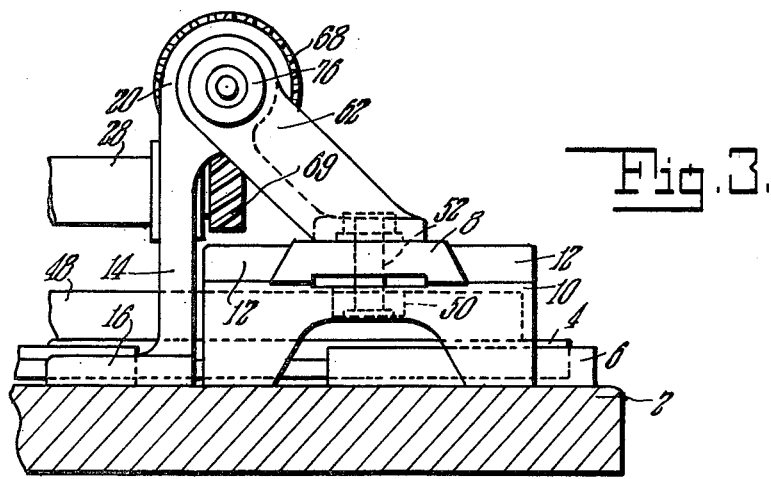
INVENTOR.
Robert H. Fay.

Patented Oct. 5, 1954

2,690,704

UNITED STATES PATENT OFFICE 2,690,704

MACHINE TOOL

Robert H. Fay, Wilbraham, Mass.

Application September 12, 1952, Serial No. 309,237

2 Claims. (Cl. 90—11.62)

This invention relates to improvements in machine tools and is directed more particularly to improvements in mechanism for manipulating a work piece relative to a tool acting thereon.

The principal object of the invention is the provision of the mechanism for rotating and advancing a piece of work in a predetermined manner relative to a tool for acting on the piece of work.

The mechanism of the invention is constructed and arranged for numerous and various uses but, for purposes of disclosure, the novel features of the invention will be referred in connection with the forming of threads.

In the forming of threads on thread gauges, extreme accuracy is required in the dimensions, form and pitch of the threads. The mechanism of the invention is not only particularly suited therefor but is characterized by such means as to render it possible to produce a screw within a wide range of thread forms, dimensions and pitch or leads. Furthermore, the constructional novelty of the mechanism is such that it is possible to reproduce duplicate plural work pieces of extreme accuracy.

According to special features of the invention, the mechanism is such that a shaft for the work piece is simultaneously rotated and reciprocated so that the work piece is moved relative to a tool. The amount of reciprocation of the shaft relative to the rotation thereof is variable within a wide range thereby to obtain a great variety of feeds and rotations.

The amount of feed or reciprocation of the work piece shaft relative to the rotation thereof may be predetermined by the selection of a size block interposed between means for rotating and means for reciprocating the shaft.

Size blocks which come within a wide range of sizes are well known to tool makers and mechanics generally as being extremely accurate as to dimensions. These are utilized to obtain a predetermined axial advancement of the work carrying shaft relative to its angle of rotation. In this way, the work carrying shaft may be advanced a predetermined distance for a revolution or revolutions thereof whereby a tool acting on the work piece carried by the shaft will produce such a pitch or lead on the work piece as will be desired.

It will be understood that while the novel features of the mechanism are referred to in connection with the formation of screw threads, the mechanism is adapted for a wide range of operations where extreme accuracy is desired and necessary.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 2 is a sectional elevational view on the line 2—2 of Fig. 1; and

Fig. 3 is a sectional elevational view on the line 3—3 of Fig. 1.

Figure 1:
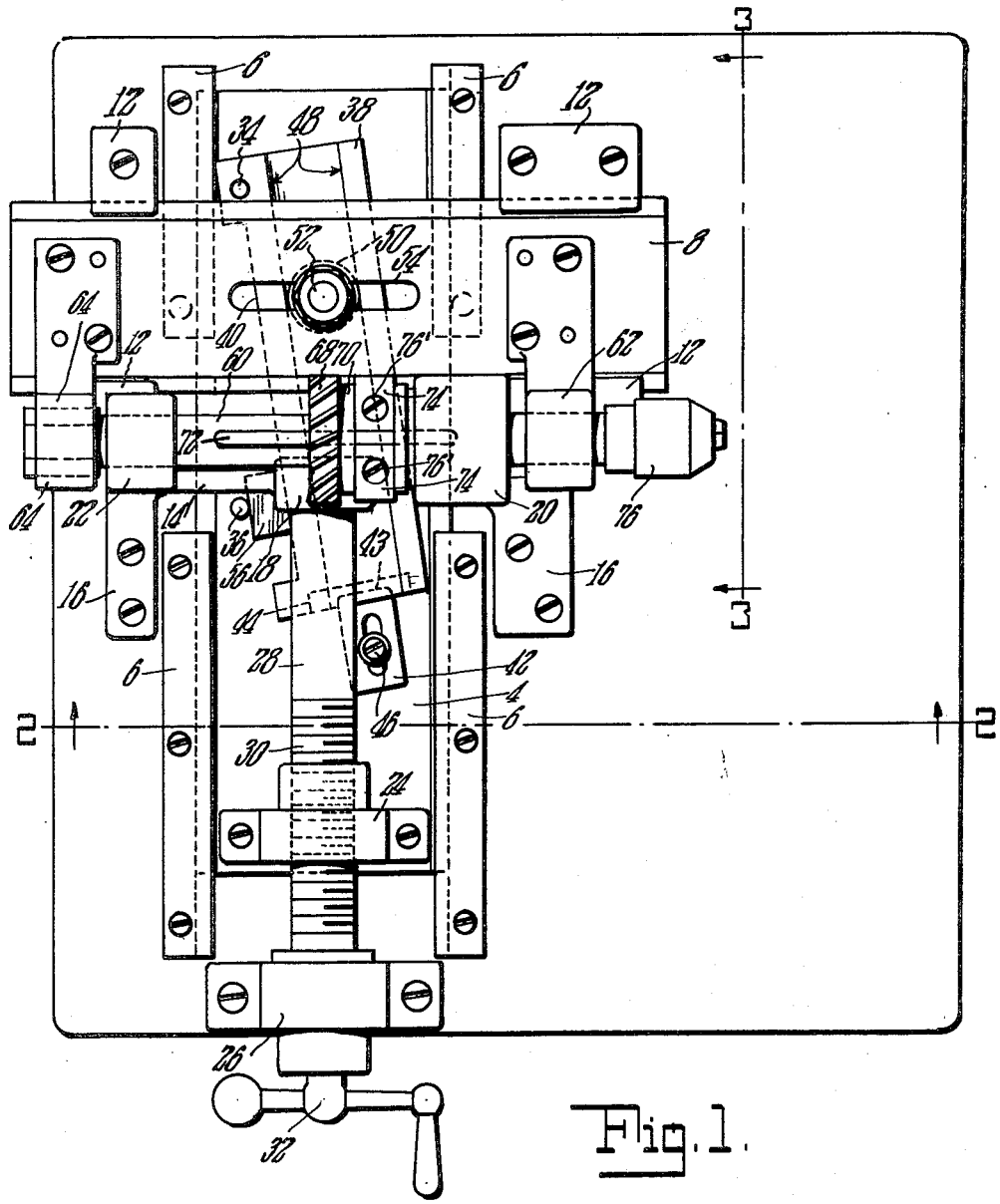
Fig. 1 is a plan view of a machine tool embodying the novel features of the invention.

Referring now to the drawings more in detail, the invention will be fully described.

A base or support 2 is provided which will be formed for rigidity and strength and adapted to support the mechanism of the invention to be described.

A lower longitudinal primary slide 4 is reciprocable back and forth in ways 6 which are secured to the base.

A transverse upper secondary slide 8 is provided which is guided for reciprocation on supports such as 10 by gibs such as 12, see Fig. 3. This slide is located above the lower slide 4.

A bracket 14 extending across the lower slide has lower feet 16 secured to the base and is provided with a central bearing 18 and right and left bearings 20 and 22.

A nut member 24 is secured to the lower end of slide 4 and a bearing 26 is secured to the base. An operating screw 28 has an intermediate portion 30 in threaded engagement with the nut member 24. Inner and outer ends of the screw 28 are rotatable in bearings 18 and 26 and held thereby against axial movement.

A manually engageable crank 32 is fixed to the outer end of screw 28 for rotation thereof. As said screw is rotated in one direction or the other, the slide 4 is reciprocated back and forth and through mechanism to be described the transverse slide 8 is reciprocated by movements of the slide 4.

Movement of the slide 4 inwardly or towards the slide 8 will be referred to as feeding movement for purposes of disclosure.

Pins 34 and 36 are fixed to the slide 4 and extend upwardly therefrom. A sine-bar 38 has an end pivoted on pin 34 and has a side face 40 in alignment with pin 34. A clamp 42 has an inner end 43 receivable in a slot 44 in the end of the sine-bar. A screw 46 in engagement with the base extends through the clamp 42 so that said clamp may act on and clamp the sine bar in various positions of adjustment.

An elongated slot 48 in the upper side of the sine-bar is provided in which a roll or block 50 is disposed. Said roll 50 is rotatable on a stud 52 which is adjustable to fixed positions along a slot 54 of the transverse slide 8.

As the slide 4 moves inwardly towards the slide 8 the slot 48 of the sine bar acts on roll 50 to move slide 8 to the right in feeding direction. The angle between the slot 48 of the sine bar and center line of the slide 4 determines the amount of movement of slide 8 relative to that of slide 4. The greater the angle the more slide 8 is moved by a certain movement of slide 4.

Size blocks such as 56 are disposed between pin 36 and side 40 of the sine-bar. A certain size block will provide a certain angle between the groove 48 of the sine bar and center line of slide 4.

A work-carrying shaft 60 is rotatable and non-reciprocable in bearings 62 and 64 which are fixed to the slide 8. Said shaft 60 is rotatable and reciprocable in bearings 20 and 22 of bracket 14 so that as the slide 8 moves in opposite directions, the shaft 60 is carried thereby.

A gear 68 adjacent bearing 20 has a hub 70 and a key 72 is carried by shaft 60. Side or key blocks 74 are slidable in and out in the hub 70 of the gear and the inner ends thereof engage the opposite sides of the key 72. Screws 76' hold the blocks 74 in positions of adjustment. This arrangement permits axial movements of the shaft 60 relative to gear 68 and provides means for taking up for wear and obviating back lash between the gear and key.

Means for holding work is carried by the end of shaft 60 and for purposes of disclosure is shown as a chuck 76. Any other work holding means may be employed.

A gear 69 is fixed to the inner end of screw 28 which is in mesh with gear 68.

As screw shaft 28 is rotated, slide 4 is reciprocated and shaft 60 is rotated and simultaneously through the sine-bar and roll connection slide 8 is reciprocated so as to move the rotating shaft 60 axially.

The pitch of screw 28 and the ratio of gears 68 and 69 is such that by a certain angle of rotation of said screw the slide 4 is moved a certain related distance and the work shaft 60 is rotated through a certain angle.

The slide 8 is moved a distance during that certain angle of rotation of the screw depending upon the angularity of the groove 48 of the sine-bar.

As previously stated, the machine may be used for various purposes but as an illustration, it is suited for forming threads of a thread gauge. In such a case, the body of the gauge is engaged by the chuck 76 so that it is rotated and fed to the right in Figs. 1 and 2 relative to a thread forming tool.

Rotation of shaft 60 and movement inwardly of the slide 4 having a definite relationship to the angle of rotation of the screw, the sine-bar is set to obtain the desired movement of slide 8 in feeding direction.

In other words, it will be known what angle of rotation of the screw is necessary in order to rotate shaft 60 through one revolution. It will also be known the distance the slide 4 moves inwardly during that angle of rotation of the screw.

As an example, during a revolution of shaft 60, slide 8 is fed the distance of one pitch of the thread being formed. This is accomplished by placing a size block such as 56 between the sine-bar and pin 36 which will produce an angle between the groove of the sine-bar and center line of slide 4 which will move slide 8 one pitch while the slide 4 is moving a certain distance during one revolution of the shaft 60.

With the distance of movement of slide 4 known for one revolution of shaft 60, the required distance of movement of slide 8 and shaft 60 for a certain pitch is readily arrived at by calculating the dimension of the size block used to set the angularity of the sine-bar.

Thus screw threads of various pitches may be formed by positioning the sine-bar at various angles, and the form of the threads may be varied according to the forming tool employed.

The mechanism is such that extreme accuracy of finished work is possible and it is possible to produce duplicate work pieces with duplicate setting of the parts.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A machine tool of the class described comprising in combination, a base, separate primary and secondary slides, separate guide means on said base for said slides arranged to guide said slides in independent sliding movements in opposed directions and position said secondary slide over said primary slide, a shaft rotatably mounted on the secondary slide on an axis parallel to the direction of movement of said slide, an operating screw rotatably mounted on said base on an axis parallel to the direction of movement of said primary slide, means on said primary slide engaging said screw and gearing operatively connecting said screw and shaft whereby rotation of said screw brings about movement of said primary slide and rotation of said screw, and engageable means carried by said slides arranged whereby sliding movements of the primary slide brings about sliding movements of the secondary slide.

2. A machine tool set forth in claim 1 wherein an elongated member adjustable on the primary slide angularly relative to its direction of movement and provided with a longitudinal groove receiving a roll provided on the secondary slide which is adjustable longitudinally relative to the direction of movement of said secondary slide.

References Cited in the file of this patent

UNITED STATES PATENTS

| Number | Name | Date |
| --- | --- | --- |
| 1,630,716 | Pierce | May 31, 1927 |
| 2,375,052 | Umbdenstock | May 1, 1945 |
| 2,456,407 | Green | Dec. 14, 1948 |

FOREIGN PATENTS

| Number | Country | Date |
| --- | --- | --- |
| 117,347 | Great Britain | July 18, 1918 |